United States Patent
Hur et al.

(10) Patent No.: US 11,167,262 B2
(45) Date of Patent: Nov. 9, 2021

(54) AMORPHOUS NANOSTRUCTURE COMPOSED OF INORGANIC POLYMER AND METHOD FOR MANUFACTURING THE SAME

(71) Applicant: KOREA INSTITUTE OF SCIENCE AND TECHNOLOGY, Seoul (KR)

(72) Inventors: Ka Hyun Hur, Seoul (KR); Min Seok Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/646,144

(22) PCT Filed: Sep. 27, 2018

(86) PCT No.: PCT/KR2018/011382
§ 371 (c)(1),
(2) Date: Mar. 11, 2020

(87) PCT Pub. No.: WO2019/066466
PCT Pub. Date: Apr. 4, 2019

(65) Prior Publication Data
US 2020/0269210 A1    Aug. 27, 2020

(30) Foreign Application Priority Data

Sep. 29, 2017 (KR) .......................... 10-2017-0128290
Oct. 20, 2017 (KR) .......................... 10-2017-0136616
Aug. 21, 2018 (KR) .......................... 10-2018-0097250

(51) Int. Cl.
*B01J 20/22* (2006.01)
*B01J 20/28* (2006.01)
*B01J 20/30* (2006.01)

(52) U.S. Cl.
CPC ....... *B01J 20/223* (2013.01); *B01J 20/28007* (2013.01); *B01J 20/3085* (2013.01)

(58) Field of Classification Search
CPC ...................................................... C08K 3/30
See application file for complete search history.

(56) References Cited

U.S. PATENT DOCUMENTS

| | | | | |
|---|---|---|---|---|
| 2012/0115312 A1* | 5/2012 | Agrawal | ........... | H01L 21/02628 438/478 |
| 2014/0170383 A1* | 6/2014 | Miszta | ...................... | C30B 5/00 428/143 |
| 2015/0017457 A1* | 1/2015 | Mizuno | ................... | G06F 3/041 428/457 |
| 2015/0194548 A1* | 7/2015 | Bourdais | ......... | H01L 31/022425 136/256 |
| 2016/0097140 A1* | 4/2016 | Robinson | ............... | C25D 13/02 428/336 |
| 2021/0178477 A1* | 6/2021 | Hur | .......................... | B22F 9/18 |
| 2021/0197267 A1* | 7/2021 | Hur | .......................... | B22F 9/24 |

FOREIGN PATENT DOCUMENTS

| CN | 108276431 A | * 7/2018 |
|---|---|---|
| CN | 110058020 A | * 7/2019 |
| CN | 110940266 A | * 3/2020 |
| CN | 111496266 A | * 8/2020 |
| CN | 111790178 A | * 10/2020 |
| CN | 112038104 A | * 12/2020 |
| KR | 1020050101802 A | 10/2005 |
| KR | 1020120053312 A | 5/2012 |

OTHER PUBLICATIONS

CAS Abstract H. Pan et al., CN 108276431 (Jul. 13, 2018) (Year: 2018).*
Prashant Kumar et al., "Synthesis of Cu1.8S and CuS from Copper-Thiourea Containing Precursors; Anionic (CI-,NO3-,SO42-) Influence on the Product Stoichiometry," Inorganic Chemistry, 2011, pp. 3065-3070, vol. 50, American Chemical Society.
Luminita Isac et al., "Copper Sulfide (CuxS) Thin Films as Possible p-Type Absorbers in 3D Solar Cells," ScienceDirect, Energy Procedia, 2010, pp. 71-78, vol. 2.
International Search Report dated Jan. 3, 2019 for PCT/KR2018/011382, citing the above reference(s).

* cited by examiner

*Primary Examiner* — Alexander R Pagano
(74) *Attorney, Agent, or Firm* — Cantor Colburn LLP

(57) ABSTRACT

Disclosed are amorphous nanostructure and methods of making amorphous nanostructure. The amorphous nanostructure has a transition metal and a halogen element in the main chain, and the transition metal has an oxidation number of +1. In addition, the inorganic polymer forming the amorphous nanostructure forms hydrogen bonding with an adjacent inorganic polymer. The side chain of the inorganic polymer for hydrogen bonding has hydrogen and elements for hydrogen bonding. Through this, various characteristics can be confirmed.

6 Claims, 19 Drawing Sheets
(2 of 19 Drawing Sheet(s) Filed in Color)

Ethylene glycol (0.790)

Diethylene glycol (0.713)

Triethylene glycol 0.704

AMORPHOUS NANOSTRUCTURE COMPOSED OF INORGANIC POLYMER AND METHOD FOR MANUFACTURING THE SAME

TECHNICAL FIELD

The present invention relates to an inorganic polymer, and more particularly to an amorphous nanostructure composed of the inorganic polymer and a method of manufacturing the same.

BACKGROUND ART

Nanomaterials having an amorphous property may be applied to various fields such as biotechnology, catalysts, thermoelectric materials, electrochemical devices such as secondary batteries, absorbents and serum separation of toxic substances.

In the field of thermoelectric materials, a thermoelectric material such as $Cu_{2-x}S$ or $Cu_{2-x}Se$ may rapidly change the figure of merit (ZT) according to a slight change in composition (change in x).

The conventional method of composition adjustment is a method of melting Cu, S or Se elements to a desired composition and sintering it, which makes it difficult to make the composition nonuniform locally. In addition, the process of melting each of the components of the thermoelectric material is time-consuming and expensive. For Cu, S or Se, a melting temperature of 1400 K or higher is required. In addition, processing time requires more than several hours for melting.

Another method is to compound Cu, S, and Se through high-energy ball milling, which is time consuming and expensive. This method is also difficult to induce local changes in composition.

Accordingly, there is a need for the development of an amorphous nanostructure that can be applied to various applications and that can adjust the composition of crystallization materials.

DISCLOSURE

Technical Problem

The first technical problem to be achieved by the present invention is to provide an amorphous nanostructure composed of an inorganic polymer, capable of local crystallization.

In addition, a second technical problem to be achieved by the present invention is to provide a method for manufacturing an amorphous nanostructure for achieving the first technical problem.

Technical Solution

The present invention for achieving the above-described first technical problem, provides an amorphous nanostructure comprising an inorganic polymer of the formula 1 below.

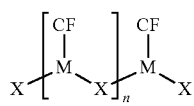

[formula 1]

In formula 1, M represents a transition metal, X represents a halogen element, CF represents a functional group for bonding including a hydrogen element and an element for hydrogen bonding, and n has a value of 10 to 500,000 in repetition frequency.

The present invention for achieving the above-described second technical problem, a step of preparing a metal precursor, a functional group for bonding and a polar solvent; and a step of mixing the metal precursor, the functional group for bonding, and the polar solvent to form the amorphous nanostructure formed by hydrogen bonding between the inorganic polymer of the formula 1.

Advantageous Effects

According to the present invention described above, it is possible to form an amorphous nanowire or a spherical nanoparticle through a simple manufacturing method. The amorphous nanostructure is formed through hydrogen bonding between inorganic polymers, and the inorganic polymer has a compound having a bonding structure of a transition metal and a halogen element in a main chain, and a compound having hydrogen and elements capable of hydrogen bonding in a side chain. Hydrogen contained in the side chain forms hydrogen bonding with an element capable of hydrogen bonding or a halogen element, through which inorganic polymers are bonded to each other to form an amorphous nanowire. In addition, depending on the polarity of the polar solvent introduced in the formation process, the inorganic polymer may be formed into a spherical nanoparticle. When formed from the spherical nanoparticle, halogen elements are excluded, and transition metal and the functional group for bonding having hydrogen elements and element for hydrogen bonding are bonded to each other.

The formed amorphous nanowire exhibits excellent adsorption capacity for metal ions and show different crystallization behavior depending on the method of application of energy. In addition, the amorphous nanowire has a function of absorbing light in a specific wavelength band such as an ultraviolet region. Therefore, it can be utilized as various functional materials.

DESCRIPTION OF DRAWINGS

The patent or application file contains at least one drawing executed in color. Copies of this patent or patent application publication with color drawing(s) will be provided by the Office upon request and payment of the necessary fee.

MODES OF THE INVENTION

Figure 1:
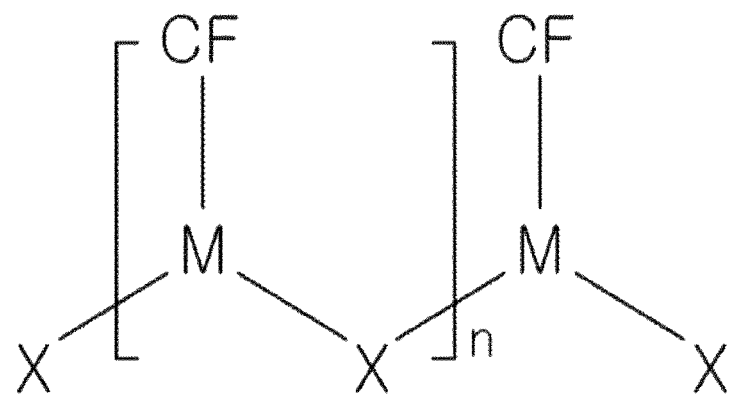
FIG. 1 is a molecular formula for explaining an inorganic polymer according to a preferred embodiment of the present invention.

As the inventive concept allows for various changes and numerous embodiments, particular embodiments will be illustrated in the drawings and described in detail in the text. However, this is not intended to limit the present invention to the specific disclosed form, it should be understood to include all modifications, equivalents, and substitutes included in the spirit and scope of the present invention. In describing the drawings, similar reference numerals are used for similar elements.

Unless defined otherwise, all terms used herein, including technical or scientific terms, have the same meaning as commonly understood by one of ordinary skill in the art. Terms such as those defined in the commonly used dictionaries should be construed as having meanings consistent with the meanings in the context of the related art, and shall not be construed in ideal or excessively formal meanings unless expressly defined in this application.

Hereinafter, with reference to the accompanying drawings, it will be described a preferred embodiment of the present invention in detail.

EXAMPLES

FIG. 1 is a molecular formula for explaining an inorganic polymer according to a preferred embodiment of the present invention.

Referring to FIG. 1, In formula 1, M represents a transition metal, X represents a halogen element, CF represents a functional group for bonding including a hydrogen element and an element for hydrogen bonding, and n has a value of 10 to 500,000 in repetition frequency.

The transition metal may be at least one element selected from the group consisting of copper (Cu), manganese (Mn), iron (Fe), cadmium (Cd), cobalt (Co), nickel (Ni), zinc (Zn), mercury (Hg), molybdenum (Mo), and titanium (Ti), magnesium (Mg), chromium (Cr) and antimony (Sb)

In addition, the halogen element may include fluorine (F), chlorine (Cl), bromine (Br), iodine (I), or a combination thereof. The halogen element is combined with the transition metal and forms a main chain in the inorganic polymer.

In particular, the functional group for bonding is composed of a compound having a hydrogen element and an element capable of forming hydrogen bonding with another inorganic polymer. For this purpose, the functional group for bonding should have a hydrogen element at the end of the chemical bond. This hydrogen element is bound to an element such as nitrogen (N), oxygen (O), or fluorine (F), which has a higher electronegativity than a hydrogen atom, and thus must have the ability of hydrogen bonding. In addition, the functional group for bonding has another element forming hydrogen bonding, and possible elements are group 15 element or group 16 element. They have unshared electron pairs and are chemically bonded to the transition metal. At least one element selected from the group consisting of oxygen (O), sulfur (S), nitrogen (N), selenium (Se), and tellurium (Te) as a group 15 element or a group 16 element that can be employed in the functional group for bonding is preferred. A hydrogen atom attached to an element having a high electronegativity can hydrogen bond with an unshared electron pair of Group 15 or Group 16 elements of another adjacent inorganic polymer. This process forms an amorphous nanostructure. The functional group for bonding is preferably thiourea, urea, selenourea, tellurourea or thiol compound.

In the inorganic polymer, the transition metal and the halogen element form a main chain, and the functional group for bonding bonded to the transition metal forms a side chain. In particular, the transition metal has an oxidation number of +1.

Figure 2:
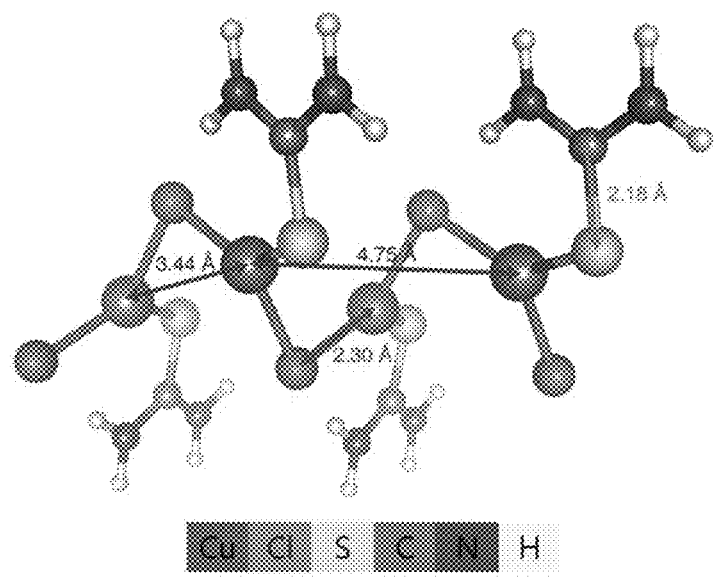
FIG. 2 is a schematic view showing the inorganic polymer of FIG. 1 according to a preferred embodiment of the present invention.

FIG. 2 is a schematic view showing the inorganic polymer of FIG. 1 according to a preferred embodiment of the present invention.

Referring to FIG. 2, certain inorganic polymer forms hydrogen bonding with an adjacent inorganic polymer and form a nanowire according to the hydrogen bonding. The hydrogen bonding is formed by a hydrogen element present in the functional group for bonding, and the hydrogen element is bonded to an element having a higher electronegativity than hydrogen. That is, the hydrogen element is positively charged and is bonded with the unshared electron pair of another inorganic polymer. Specifically, the hydrogen bonding may be made between the hydrogen element of the functional group for bonding with one inorganic polymer and the halogen element of the other inorganic polymer, or between the hydrogen element of the bonding functional group and the group 15 element or group 16 element of the other inorganic polymer. As a result, the inorganic polymer is combined with the adjacent inorganic polymer and forms an amorphous nanowire.

In more detail, in FIG. 1, Cu is used as the transition metal, Cl is used as the halogen element, and thiourea is used as the functional group for bonding. Accordingly, the main chain of the inorganic polymer is CuCl, and thiourea is bonded using Cu as the center metal. Sulfur (S) of thiourea forms a bond with the central metal Cu.

In FIG. 2, two kinds of hydrogen bonds are formed to form an amorphous nanostructure. In FIG. 2, the hydrogen element is combined with a nitrogen element having a higher electronegativity, and thus has a capability of hydrogen bonding. The first is when the hydrogen atom of thiourea which forms a side chain is hydrogen-bonded with Cl which is a halogen element of a main chain. The second is when the hydrogen atom of thiourea is hydrogen bonded to the sulfur of the side chain. In any case, the hydrogen bonds cause the inorganic polymers to have a predetermined volume and form agglomerated or uniform form. In addition, the amorphous nanostructure formed by the hydrogen bond may have a form of a wire, and may have a form in which a bond between a hydrogen-halogen element and a bond between a hydrogen-16 element/hydrogen-15 element is mixed.

Figure 3:
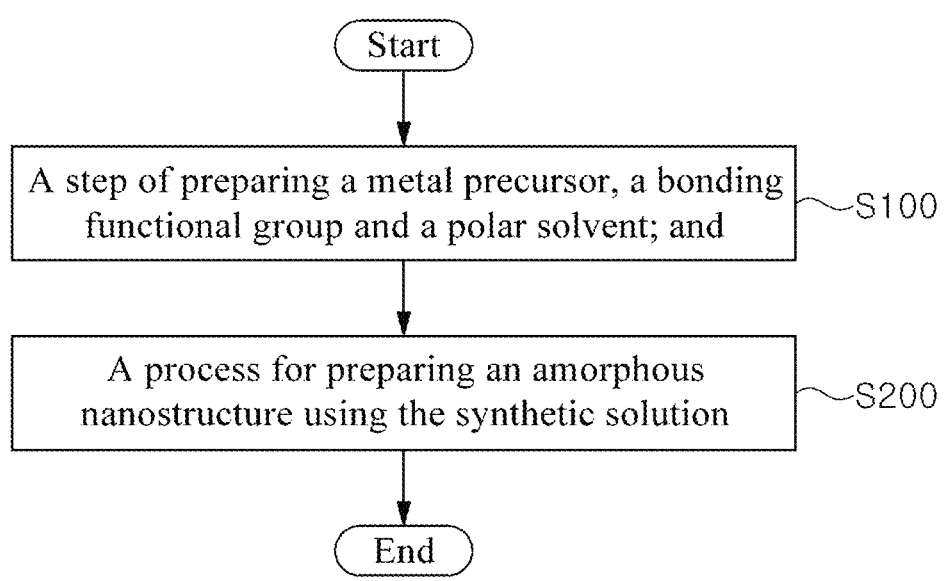
FIG. 3 is a flowchart illustrating a method of manufacturing an amorphous nanostructure according to a preferred embodiment of the present invention.

FIG. 3 is a flowchart illustrating a method of manufacturing an amorphous nanostructure according to a preferred embodiment of the present invention.

First, a metal precursor, a functional group for bonding, and a polar solvent are prepared (S100).

The metal precursor comprises a transition metal, which must be able to have several oxidation numbers. The transition metal used are at least one element selected from the group consisting of copper (Cu), manganese (Mn), iron (Fe), cadmium (Cd), cobalt (Co), nickel (Ni), zinc (Zn), mercury (Hg), molybdenum (Mo), titanium (Ti), magnesium (Mg), chromium (Cr) and antimony (Sb).

For example, the metal precursor includes at least one selected from the group consisting of chloride, nitrate, sulfate, acetate, acetylacetonate, formate, hydroxide, oxide and hydrate thereof, including the transition metal mentioned.

The functional group for bonding needs to have a hydrogen element having hydrogen bonding ability and an element capable of forming hydrogen bonding with the hydrogen element. A suitable functional group for binding thereto is preferably thiourea, urea, selenourea, tellurea or thiol compound. However, the functional group for bonding is most preferably a group 15 element or a group 16 element, but may include any element in the environment that may have an unshared electron pair. That is, in addition to the compounds mentioned, it will be possible to make various selections as needed at the level of those skilled in the art.

In addition, the polar solvent prepared is for dissolving or dispersing the metal precursor and the functional group for bonding. Polar solvent that can be used include alcohol, glycol, polyglycol or water. The alcohol includes methanol, ethanol, propanol or butanol. In addition, the polyglycol includes ethylene glycol, diethylene glycol, triethylene glycol, and the like.

In addition, a pH adjusting agent may be added to the polar solvent. In this way, the polarity of the synthetic solution consisting of dissolved metal precursor, the functional group for bonding and the polar solvent is controlled. According to the change in polarity of the synthetic solution, the diameter or length of the nanostructure manufactured may be changed to obtain various nanostructures. The pH adjusting agent has an acid or a base and as the pH adjusting agent, hydrochloric acid, hydrofluoric acid, formic acid, acetic acid, hydrocyanic acid, sulfuric acid, nitric acid, carbonic acid, amino acid, citric acid, ascorbic acid, potassium hydroxide, lithium hydroxide, sodium hydroxide, barium hydroxide, strontium hydroxide, copper hydroxide, beryllium hydroxide, methoxylated Ion, ammonia, amidated ion, methyl anion, cyanide ion, acetic acid anion or formic acid anion can be used.

Through the above-described process, a synthetic solution including the metal precursor, the compound including the functional group for bonding, and the polar solvent are formed. In addition, as mentioned, pH adjusting agent may be added to the synthetic solution.

Subsequently, a process for preparing an amorphous nanostructure using the synthetic solution is disclosed (S200).

For example, an amorphous nanostructure is prepared in a synthetic solution through mixing, stirring, ultrasonic sonicating, shaking, vibrating, agitating or flowing the synthetic solution.

In addition, the reaction temperature in the synthetic solution may be set to the boiling point of 0° C. to the polar solvent, preferably in the range of 5° C. to 50° C., more preferably may have a range of 10° C. to 40° C. Since the temperature range belongs to room temperature, those skilled in the art can induce a reaction without limiting the temperature.

In this reaction, the oxidation number of the metal precursor decreases to have a value of +1, and a main chain of the central metal and the halogen element is formed. That is, the transition metal constituting the metal precursor in the state before the reaction may have various oxidation numbers of 1 or more, but the transition metal constituting the metal precursor through the reaction has an oxidation number of +1 and acts as a core metal in the inorganic polymer. In addition, the halogen element included in the metal precursor is bonded to the transition metal or the center metal to form the main chain of the inorganic polymer. During the formation of the main chain, some halogen elements that do not bond with the central metal may escape and float in the ionic state in the synthetic solution.

In addition, the functional group for bonding forms a chemical bond with the central metal. In the bonding process, the functional group for bonding donates an unshared electron pair to the central metal. In particular, the functional group for bonding has a group 15 element or a group 16 element in addition to the hydrogen element, and these elements are bonded by donating an unshared electron pair to the center metal, and the hydrogen element forms hydrogen bonding with another synthesized inorganic polymer.

In this way, inorganic polymers are synthesized, and an amorphous nanostructure is formed by forming hydrogen bonding between inorganic polymers.

Figure 4:
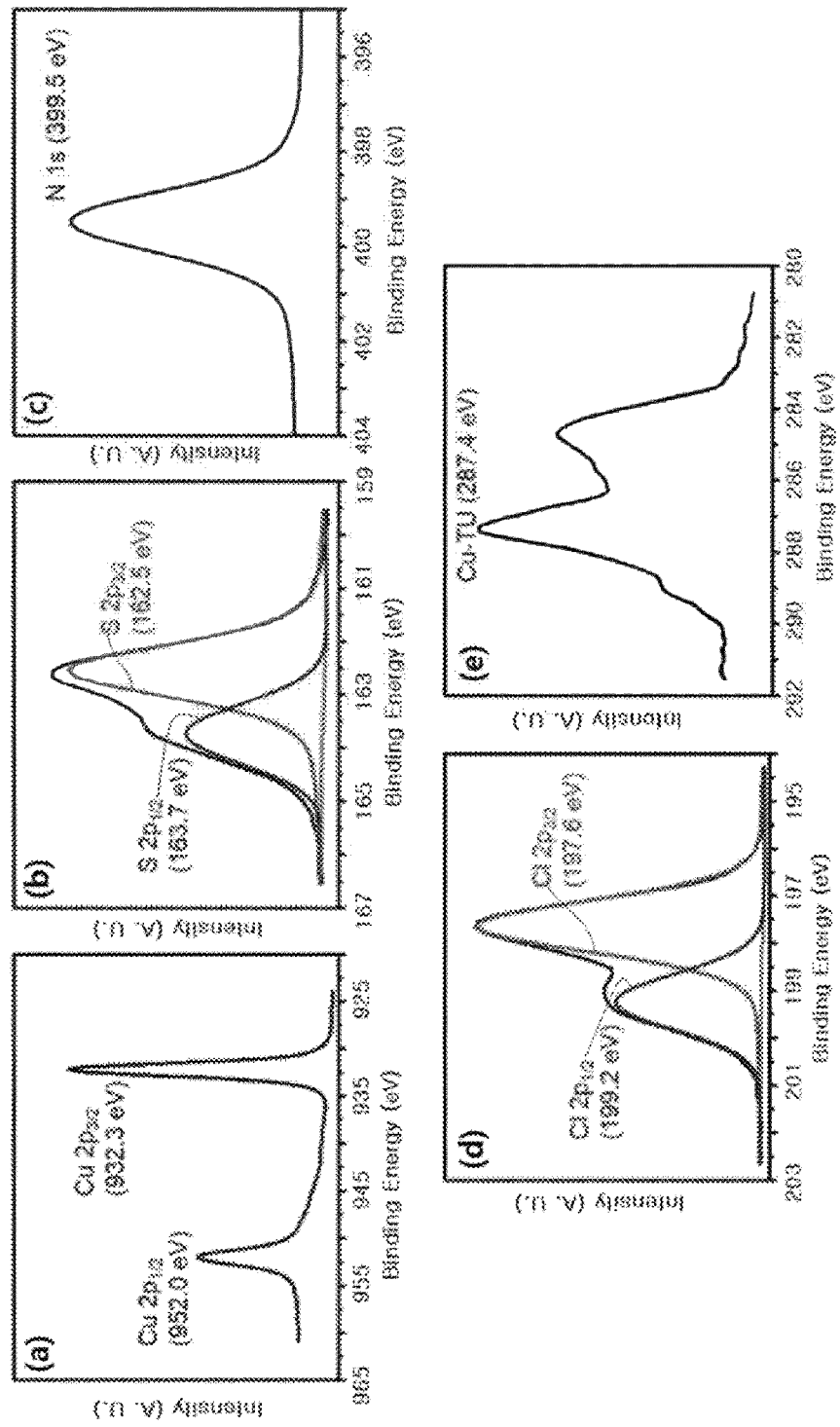
FIG. 4 is XPS analysis graphs of the amorphous nanowire according to preparation example 1 of the present invention.

Preparation Example 1: Synthesis of an Amorphous Nanowire 50 mg $CuCl_2$ and 50 mg Thiourea powder were placed in a beaker. $CuCl_2$ is used as a metal precursor, and the oxidation number of Cu is +2. In addition, thiourea is also used as a binding functional group. 80 ml of ethanol as the polar solvent is added to the beaker. The synthetic solution mixed with $CuCl_2$, thiourea and ethanol is ultrasonically dispersed at room temperature. Ultrasonic dispersion is performed for 1 to 2 minutes, through which the amorphous nanowire is synthesized. FIG. 4 is XPS analysis graphs of the amorphous nanowire according to preparation example 1 of the present invention.

Referring to FIG. 4, it can be seen that the nanowire formed using ethanol as a polar solvent according to preparation example 1 is composed of Cu, S, N and Cl. In addition, since the hydrogen atom cannot be identified on the XPS phase, the description thereof is omitted. First, in the graph (a) of FIG. 4, the binding energy of the p orbital of Cu is started, and since there is no clear peak between Cu $2p_{1/2}$ and Cu $2p_{3/2}$, it can be seen that the oxidation number of Cu is +1. That is, Cu forms a main chain with a single bond with Cl, which is a surrounding halogen element. Graph (b) shows the state in which thiourea is bound to Cu by the detection peak of sulfur (S). Graph (c) shows the presence of nitrogen, it is possible to check the state of hydrogen bonded to nitrogen in a state in which the nitrogen atom of the thiourea is bound in the inorganic polymer without separation. In addition, graph (d) confirms the presence of the halogen element Cl, and graph (e) shows a state in which Cu and thiourea are directly bonded.

Through this, the molecular formula of the inorganic polymer of FIG. 1 can be confirmed, and formation of an amorphous nanowire by hydrogen bonding can be confirmed.

In particular, it can be seen that Cu and Cl form a chemical bond, and there is a bond between Cu and thiourea. In addition, it can be seen that the oxidation number of Cu is mainly +1 and exists at the valence of $Cu^{+1}$. That is, the oxidation number of Cu in $CuCl_2$ is +2, but when synthesized as an amorphous nanostructure, the oxidation number of Cu decreases and has a value of +1, and it can be seen that the Cu—Cl bond is formed in the main chain of the inorganic polymer.

Figure 5:
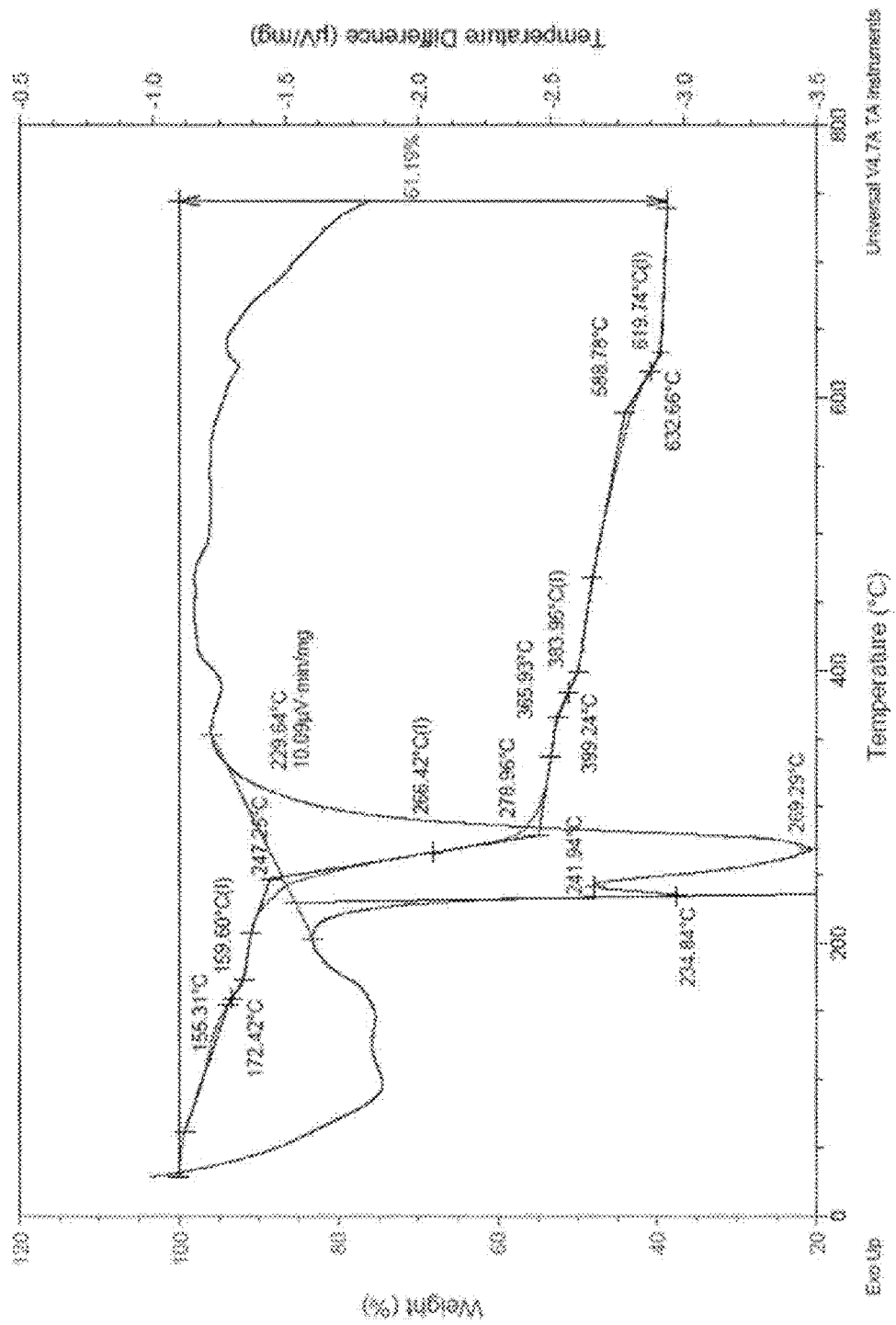
FIG. 5 is a graph showing the DSC and TGA results for the amorphous nanowire prepared in preparation example 1 of the present invention.

FIG. 5 is a graph showing the DSC and TGA results for the amorphous nanowire prepared in preparation example 1 of the present invention.

Referring to FIG. 5, differential scanning calorimetry (DSC) analysis displays an energy input difference as a function of temperature while changing the temperature of a sample to be measured and a reference material. In FIG. 5, an exothermic reaction is observed at around 200° C. This indicates that the amorphous nanowire starts crystallization around 200° C. In addition, the nanowire exhibits a strong endothermic reaction at around 250° C. This indicates that decomposition due to endothermic reaction occurs in the synthesized amorphous nanowire. That is, some of the thiourea has been separated from the backbone in the amorphous nanowire.

In addition, referring to FIG. 5, a TGA (Thermogravimetry) analysis is performed, which measures the change in mass of the sample as a function of temperature while changing the temperature of the sample to be measured. In FIG. 5, a phenomenon in which the weight is sharply decreased at a temperature of 250° C. is shown. It is interpreted that the thiourea is separated by the endothermic action of the amorphous nanowire. At temperatures above 250° C., the weight of the sample gradually decreases, and the weakly attached elements on the surface are gradually separated. In other words, the amorphous nanowire of preparation example 1 has a crystallization process at 200° C., and has a process in which the thiourea constituting the side chain of the inorganic polymer is separated by an endothermic reaction at a temperature of about 250° C. to rapidly decrease the weight. In the other temperature range, there is no significant change in which the change of composition is intensified.

Figure 6:
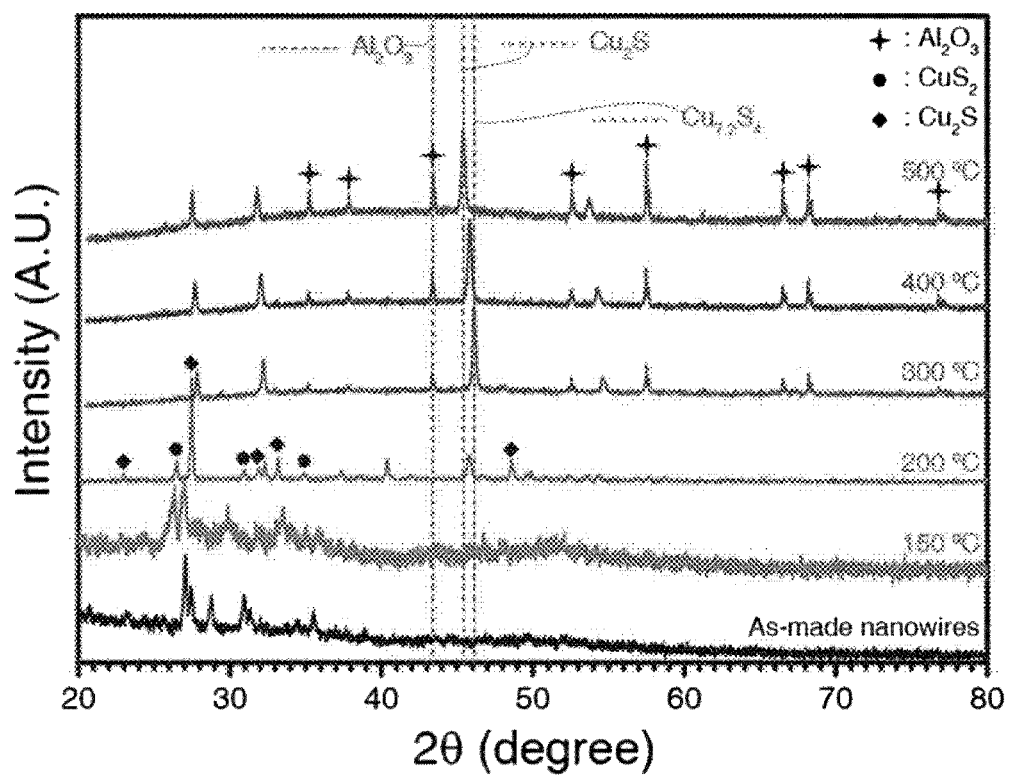
FIG. 6 is a graph showing the results of XRD analysis according to the heat treatment temperature of the amorphous nanowire of preparation example 1 of the present invention.

FIG. 6 is a graph showing the results of XRD analysis according to the heat treatment temperature of the amorphous nanowire of preparation example 1 of the present invention.

Referring to FIG. 6, the amorphous nanowire of the present example was collected by centrifugal separator, heat treated at temperatures of 150° C., 200° C., 300° C., 400° C. and 500° C., and the analysis results of the nanowire after the heat treatment were Shown. At temperatures below 200° C., they do not have distinct peaks corresponding to the crystallized material. Above 200° C., distinct peaks related to crystallization begin to appear, which is linked to the crystallization process around 200° C. in the DSC results of FIG. 5. From this point on, peaks corresponding to $CuS_2$ and $Cu_2S$ begin to appear. This indicates that with the progress of crystallization, some inorganic polymer structures were locally crystallized into $CuS_2$ and $Cu_2S$, respectively. However, this process does not show distinct peaks corresponding to the two crystal phases. It can be seen that the thiourea was decomposed near 250° C. of FIG. 5 to cause a sudden mass change, which means loss of sulfur (S) atoms. That is, this means that the element ratio of Cu becomes large compared with S. In fact, when the heat treatment was performed at 300° C., the peak of $CuS_2$ having a large amount of sulfur disappeared and only a peak corresponding to $Cu_{7.2}S_4$ appeared. In addition, showing a clear crystallization peak, indicating a stable bond between Cu and S. In addition, it can be seen that the element ratio of Cu increases slightly compared to S in the heat treatment process of 400° C. and 500° C. In FIG. 5, it was found that the weight gradually decreased at a temperature above 250° C., which may be due to a loss in S. That is, as S disappears little by little, the phase change is made from $Cu_{7.2}S_4$ to $Cu_2S$ having a large fraction of Cu. That is, the amorphous nanowire of Preparation example 1 is crystallized through heat treatment, and there is an advantage that the element ratio between Cu and S can be controlled by changing the crystallization temperature.

Figure 7:
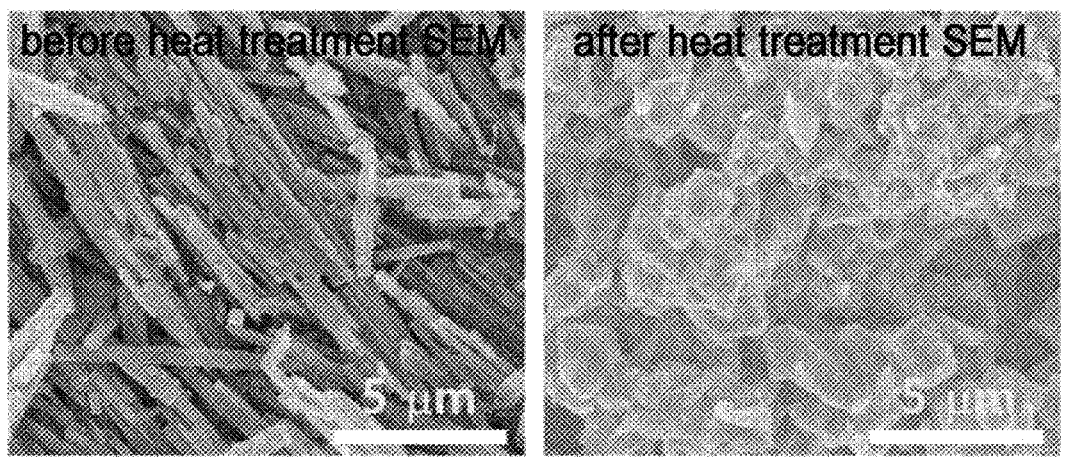
FIG. 7 is SEM images showing before and after heat treatment of the amorphous nanowire according to preparation example 1 of the present invention.

FIG. 7 is SEM images showing before and after heat treatment of amorphous nanowire according to preparation example 1 of the present invention.

Referring to FIG. 7, the amorphous nanowires are disclosed before heat treatment. In addition, after the heat treatment is performed at 200° C., the shape of the nanowire disappears, and the plate-shaped structures are aggregated to each other. That is, some of the Cu—Cl bonds forming the main chain are broken, and the shapes of the nanowire is separated from each other, or they are combined with an adjacent nanowire to form a plate-like aggregated form. However, it is judged that the plate-shaped aggregated form shows crystallinity, but such crystallinity does not form a perfect single crystal. That is, crystal phases appear in some areas or substantial areas of the plate shape, and these may be judged as polycrystals depending on observation or some crystal grains may be formed in the amorphous bulk. Since these are not perfect single crystals in their entirety, they are referred to as an amorphous nanostructure in the present embodiment for convenience of description.

Preparation Example 2: Changes in Shape and Composition of a Nanostructure According to the Polarity of Solvents In preparation example 1, the length and diameter of the synthesized nanowire were observed using ethylene glycol (polarity 0.790), diethylene glycol (polarity 0.713), and triethylene glycol (polarity 0.704) instead of ethanol as polar solvents.

Figure 8:
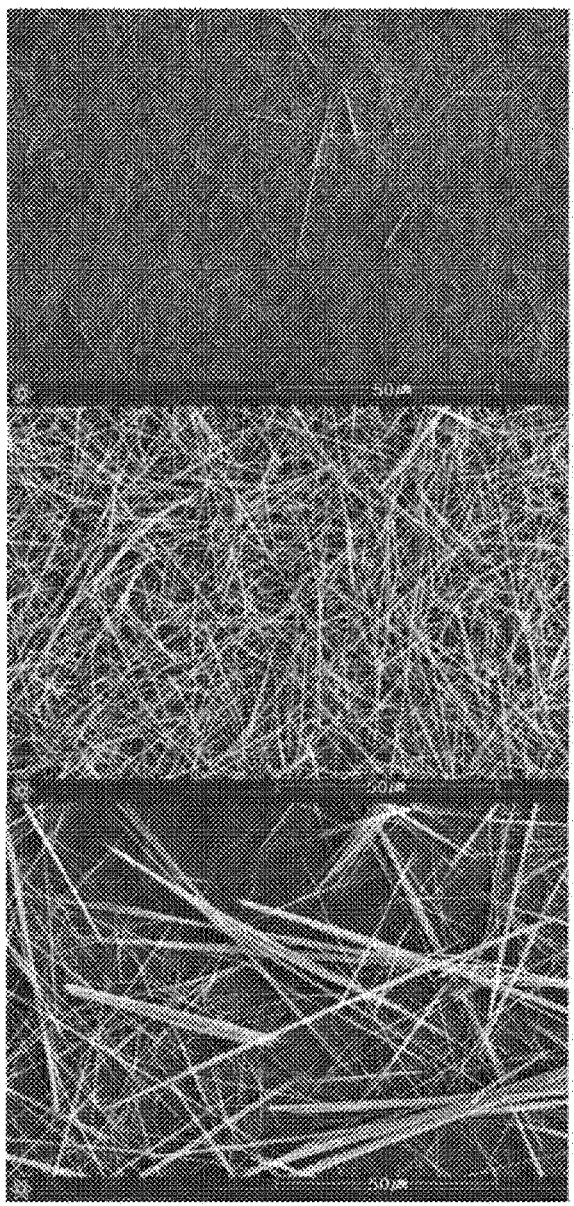
FIG. 8 is an SEM image of the nanowires prepared by preparation example 2 of the present invention at the same magnification.
Figure 8:
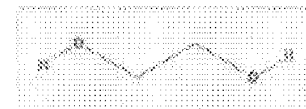
Figure 8:
Figure 8:

FIG. 8 is an SEM image of the nanowires prepared by preparation example 2 of the present invention at the same magnification.

Referring to FIG. 8, it can be seen that as the polarity of the solvent increases, the diameter and length of the synthesized nanowires decrease. This is due to a phenomenon in which a solvent having a high polarity interferes with hydrogen bonding between the synthesized inorganic polymers, and a functional group for bonding or the like interferes with the synthesis. That is, it can be seen that the diameter and length of the nanostructure can be controlled by controlling the polarity of the solvent.

Figure 9:
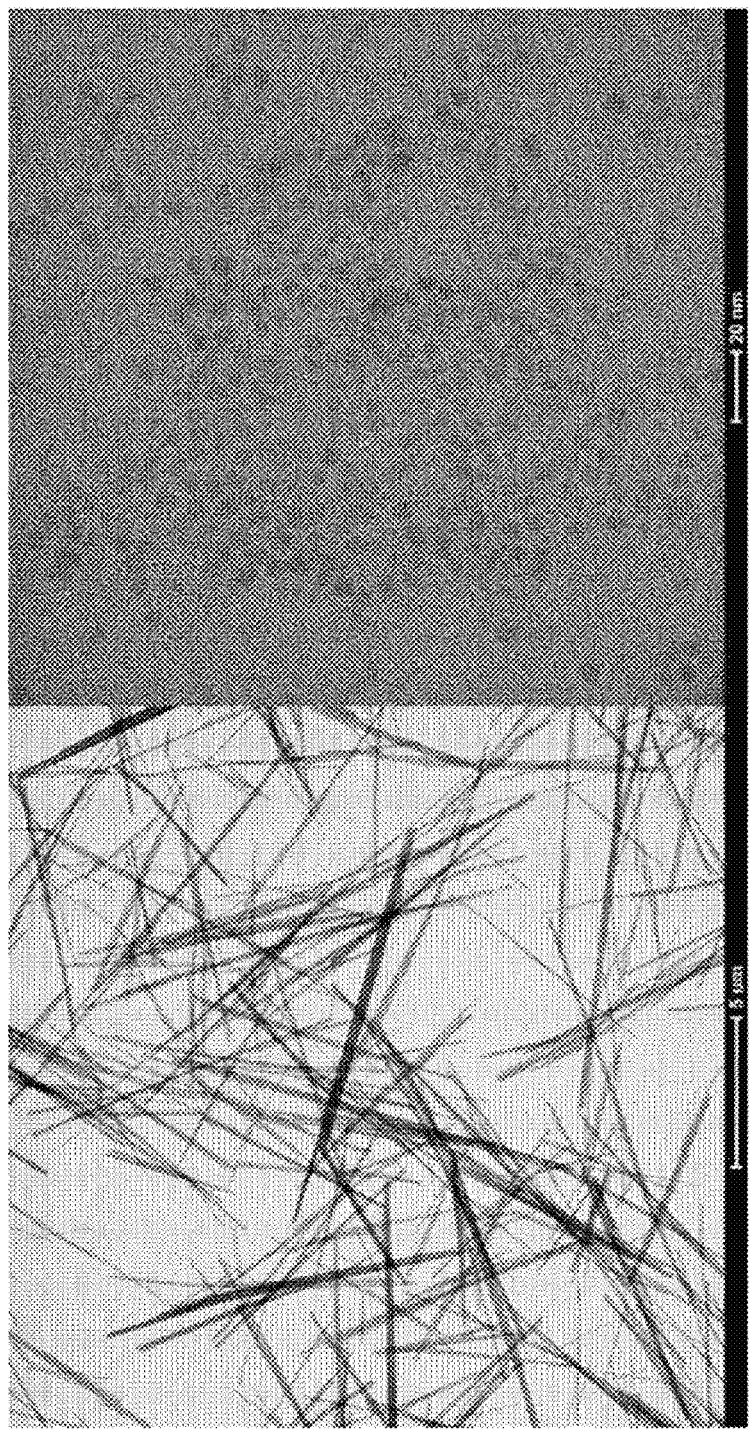
FIG. 9 is an image showing a prepared nanostructure when ethanol and water are used as polar solvents according to preparation example 2 of the present invention.

FIG. 9 is an image showing a prepared nanostructure when ethanol and water are used as polar solvents according to preparation example 2 of the present invention.

Referring to FIG. 9, a nanostructure is synthesized using water (polar 1.0) as a polar solvent instead of ethanol of Example 1. It is also compared with the nanostructure prepared by Example 1. As shown in the left image of FIG. 9, when ethanol is used as the polar solvent, a nanowire is synthesized. On the other hand, when looking at the image on the right using water having a large polarity as a polar solvent, spherical nanoparticles having a uniform size are formed instead of a nanowire. Spherical nanoparticles have a diameter of 10 nm or less. This is due to the phenomenon that the large polar solvent interferes with the binding or formation of the polymer backbone and the binding functional group to the core metal. For the reasons described, spherical nanoparticles are formed.

Table 1 below is data obtained by measuring the components of the nanowire and the spherical nanoparticles prepared in FIG. 9 by EDS, and has an error range of ±10% due to the characteristics of the measurement. In addition, a hydrogen atom is excluded from a measurement object for the convenience of description.

TABLE 1

| Species | Atomic ratio of Cu:S:N:Cl |
|---|---|
| Nanowires Synthesized in Ethanol | 1:1:2:1 |
| Spherical Nanoparticles Synthesized in Water | 6:3:1:0 |

Referring to Table 1, it can be seen that the nanostructure using ethanol as a polar solvent is of a nanowire type, Cu—Cl forms a main chain, and S, a group 16 element, is bonded to Cu, which is a central metal. In addition, since N of the thiourea has a composition ratio of 2, it can be seen that the thiourea acts as a functional group for bonding.

For spherical nanoparticles synthesized in water, Cl is not detected. This is a very unusual phenomenon that means that the main chain of Cu—Cl is not formed, it can be seen that Cl serves as a bridge for nanowire synthesis. In other words, it can be seen that Cl drives the growth in the longitudinal direction. In addition, it can be seen that the spherical nanoparticles are formed in a form in which a transition metal and a group 16 element are bonded to each other.

Preparation Example 3: Crystallization of Nanowire by Electron Beam

In this preparation example, local crystallization of the amorphous nanowire formed in preparation example 1 is performed. The electron beam is irradiated for crystallization and confirms the crystallization state.

Figure 10:
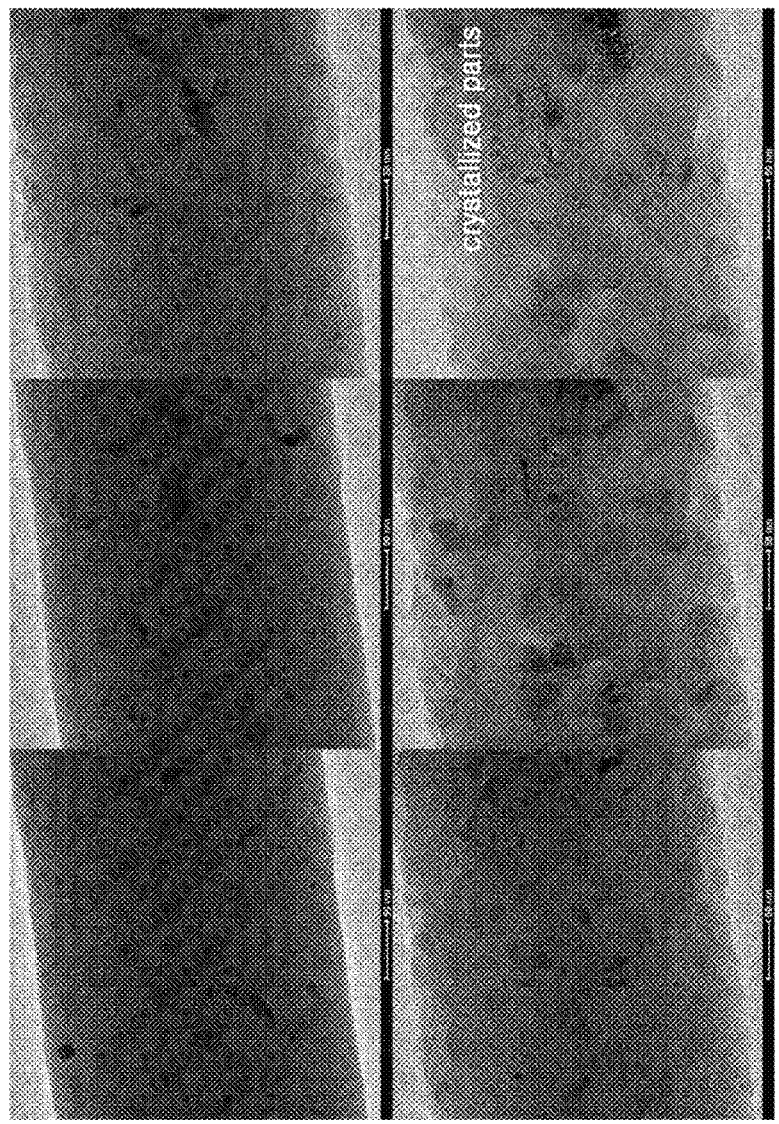
FIG. 10 is an image showing the crystallized state in the amorphous nanowire according to preparation example 3 of the present invention.

FIG. 10 is an image showing the crystallized state in the amorphous nanowire according to preparation example 3 of the present invention.

Referring to FIG. 10, an amorphous nanowire formed by preparation example 1 is used as an amorphous nanowire. When the electron beam is incident on the amorphous nanowire and energy is applied, the amorphous state is locally modified to crystalline. Grain boundaries appear in the form of grains in the image of FIG. 10. In addition, crystallized grain boundaries are identified as CuCl. That is, it can be seen that the crystal grain is dominated by the bonding of CuCl, and the thiourea, which contributes to the formation of the amorphous nanowire, is released from Cu, which is a central metal.

Figure 11:
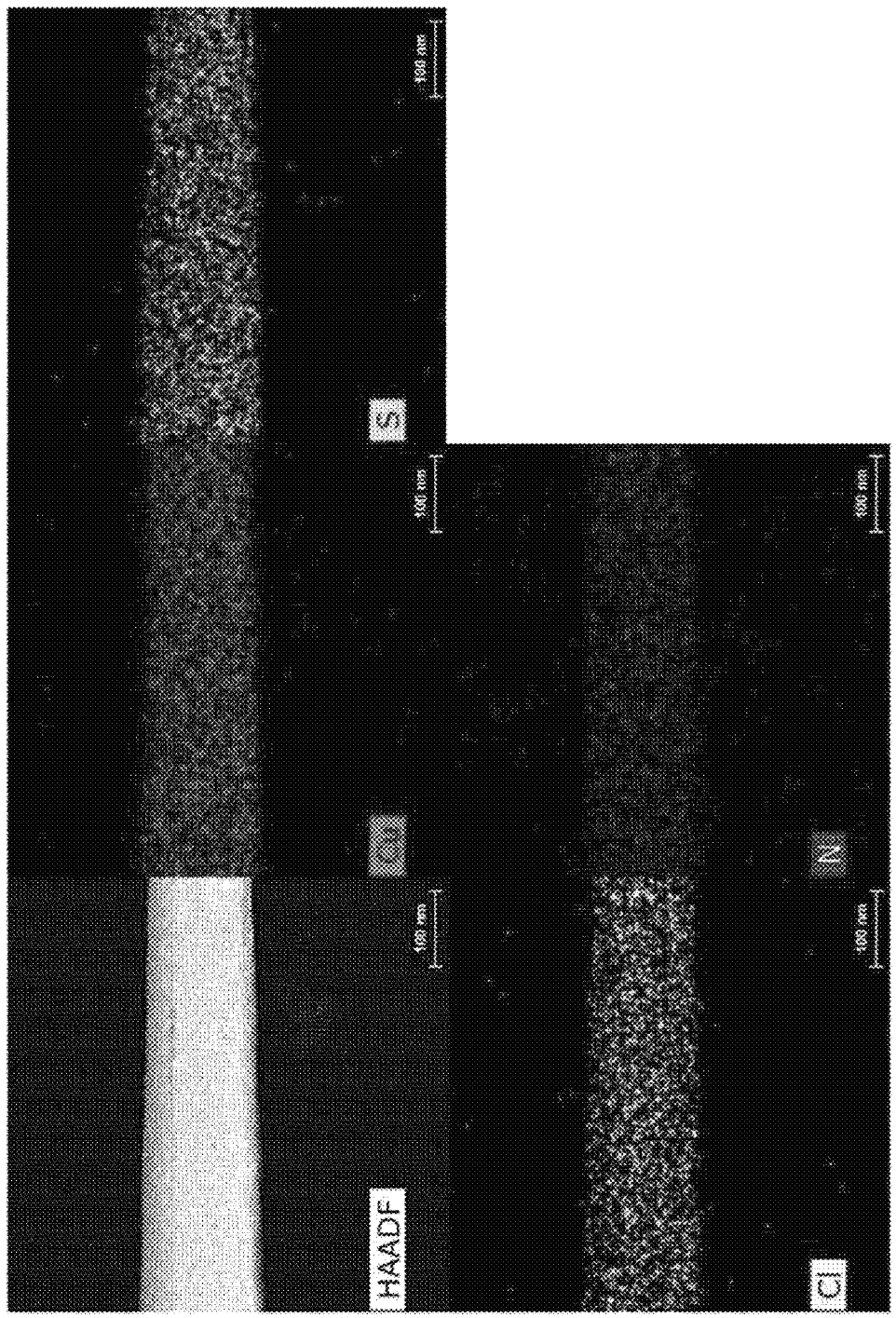
FIG. 11 and FIG. 12 are EDS mapping images showing before and after electron beam irradiation according to preparation example 3 of the present invention.
Figure 12:
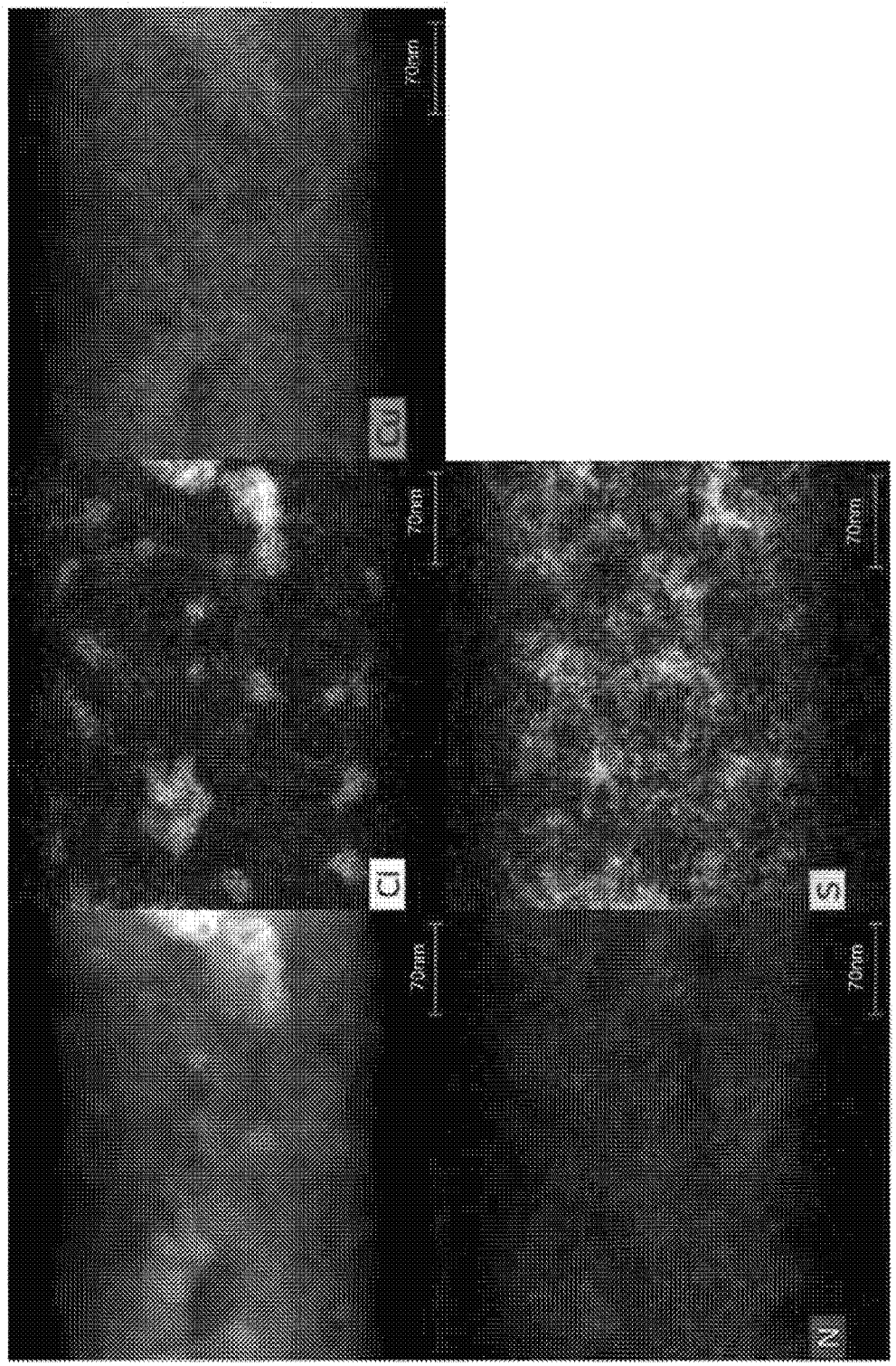

FIG. 11 and FIG. 12 are EDS mapping images before and after electron beam irradiation according to preparation example 3 of the present Referring to FIG. 11, an EDS mapping image of the amorphous nanowire formed according to preparation example 1 in a state before electron beam irradiation is disclosed. Referring to FIG. 11, it can be seen that Cu, S, N, and Cl are evenly distributed throughout the nanowire before the electron beam is irradiated.

Referring to FIG. 12, it can be seen that crystallization proceeds in the local region of the nanowire in the state after the electron beam irradiation. In particular, Cl is concentrated in the crystallization region, which is a local region. It can also be seen that Cu, N and S are evenly distributed within the nanowire. It can be seen that Cu and Cl preferentially crystallize by irradiation of the electron beam. Since the crystallized part is CuCl, it can be seen that the oxidation number of Cu is maintained at 1.

In FIG. 6, local crystallization in the form of CuCl occurs by the electron beam, in contrast to crystallization between Cu and S by heat. It is a unique phenomenon that it can be crystallized in different forms according to different sources of energy, and it is considered that it can be used for various applications.

Preparation Example 4: Elemental Substitution of Amorphous Nanowire

In this preparation example, in the amorphous nanowire synthesized in preparation example 1, the halogen element Cl forming the main chain of the inorganic polymer is replaced with another halogen element Br, and the thiourea forming the side chain is replaced with selenourea.

In addition, the manufacturing conditions of a nanowire are the same as described in preparation example 1. That is, $CuBr_2$ and selenourea are mixed, and ethanol is used as the polar solvent. The molarity of the precursor used for each mixing is the same as preparation example 1. For example, in the experiment in which Cl of the main chain was substituted with Br, 84.6 mg of $CuBr_2$ and 50 mg of thiourea were stirred by 80 ml of ethanol.

Figure 13:
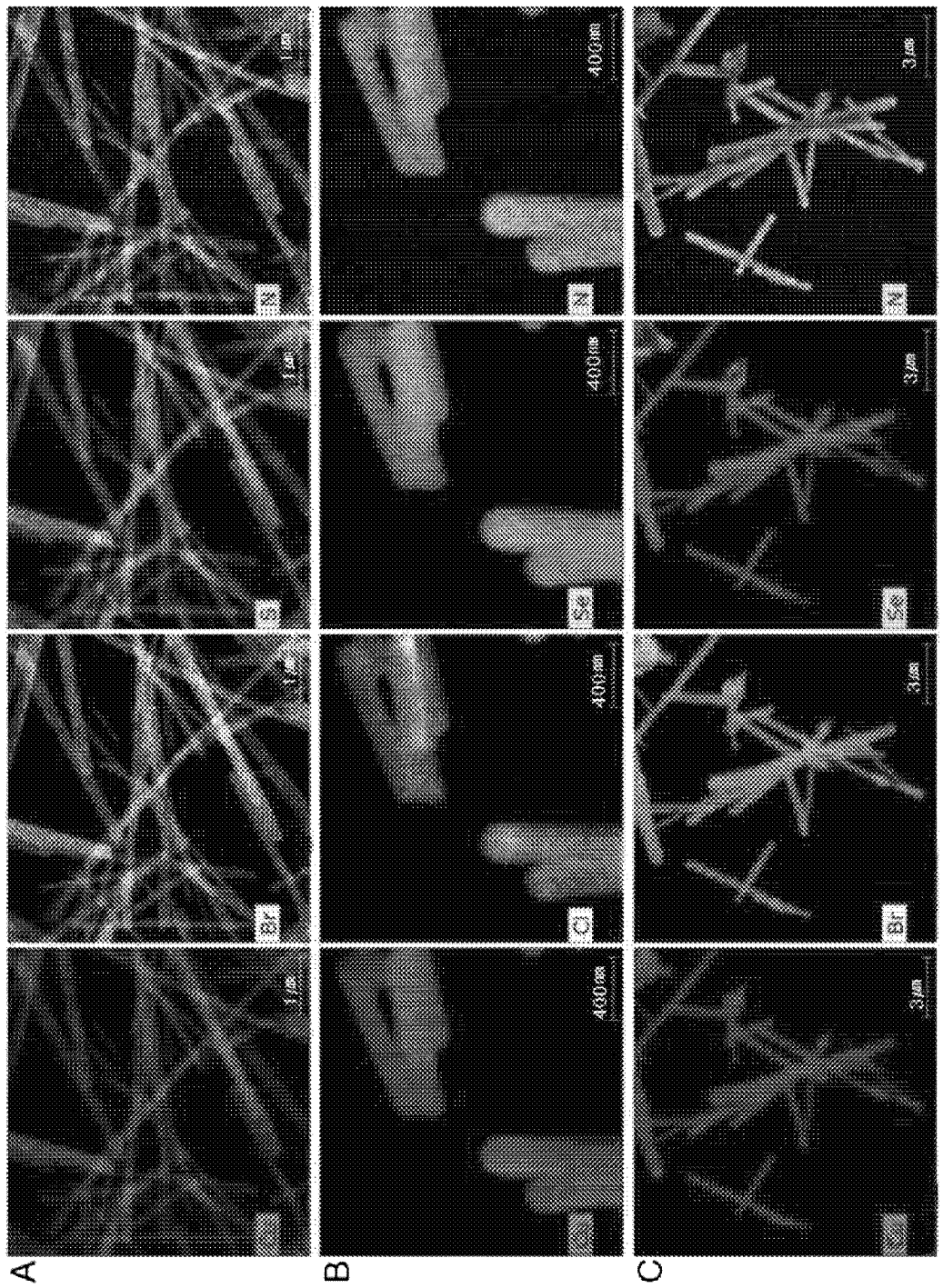
FIG. 13 is EDS mapping images of the nanowire prepared by elements substituted according to preparation example 4 of the present invention.

FIG. 13 is EDS mapping images showing the nanowire prepared by elements substituted according to preparation example 4 of the present invention.

Through this, it can be seen that the transition metal and the halogen element are chemically bonded to form a main chain, and the group 16 element is bonded through a bond sharing an unshared electron pair with the transition metal, and the nanostructure through hydrogen bonding can be formed by hydrogen forming side chains with the group 16 element.

Evaluation Example 1: Evaluation of Adsorption Capability of the Nanowire

Adsorption capacity for other elements or chemicals is confirmed for the nanowire prepared according to preparation example 1. In particular, the adsorption capacity for the heterogeneous material is carried out by mixing a solution in which metal ions or toxic anion molecules and the like are dissolved with the amorphous nanowire of preparation example 1.

FIG. 14 to FIG. 17 are images showing the adsorption capacity of the nanowire of preparation example 1 according to evaluation example 1 of the present invention.

Figure 14:
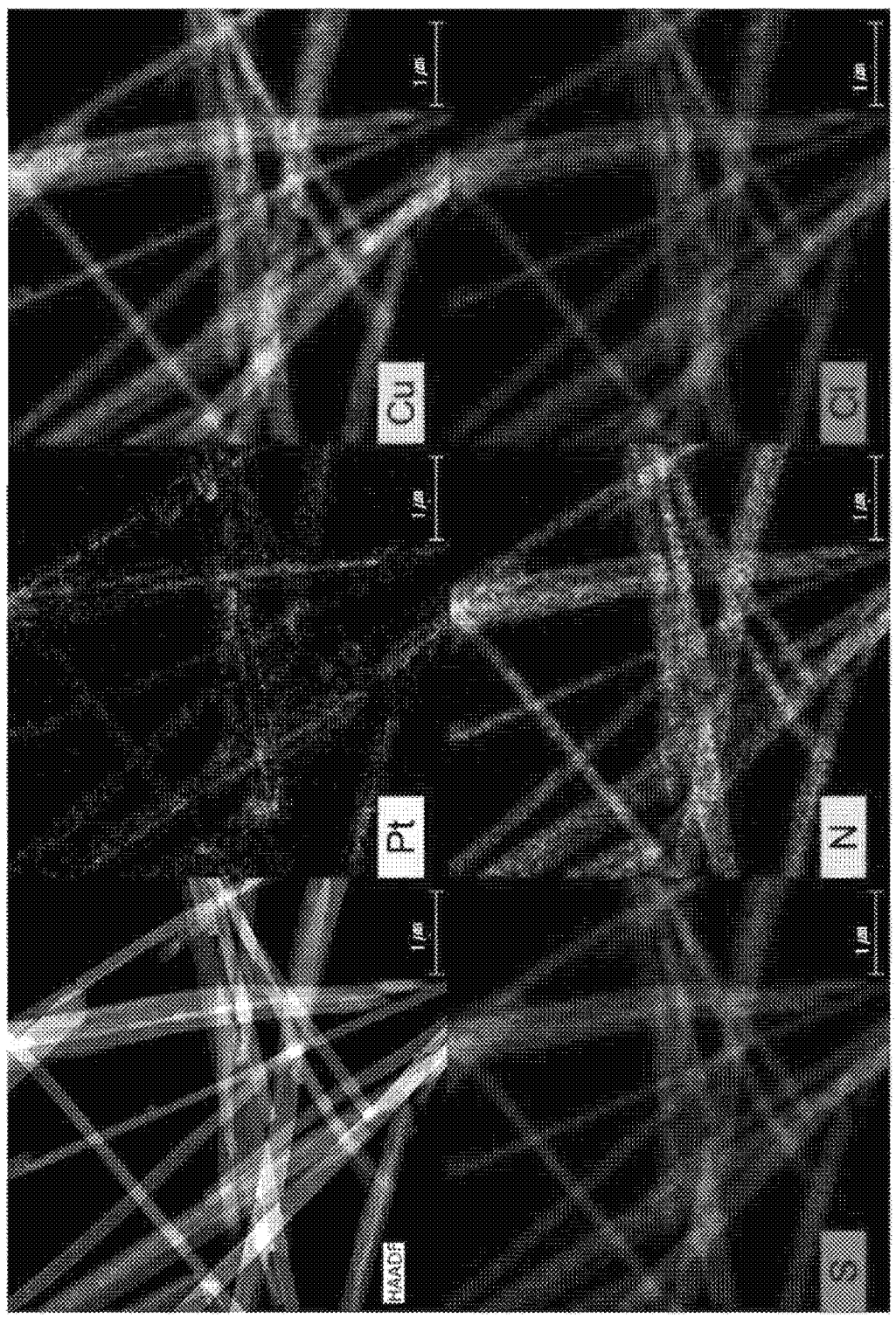
FIG. 14 to FIG. 17 are images showing the adsorption capacity of the nanowire of preparation example 1 according to evaluation example 1 of the present invention.

Referring to FIG. 14, an EDS mapping image adsorbed in a solution in which Pt atoms are dissolved at 5 wt % in the nanowire prepared in Preparation example 1 is disclosed. An aqueous solution containing $PtCl_4$ is used to evaluate the adsorption capacity of the nanowire to Pt atoms, and the nanowire are mixed in the aqueous solution. The Pt atoms in the aqueous solution are dissolved in cations at 5 wt %. It can be seen from the EDS mapping image that Pt atoms are evenly adsorbed on the nanowire.

Figure 15:
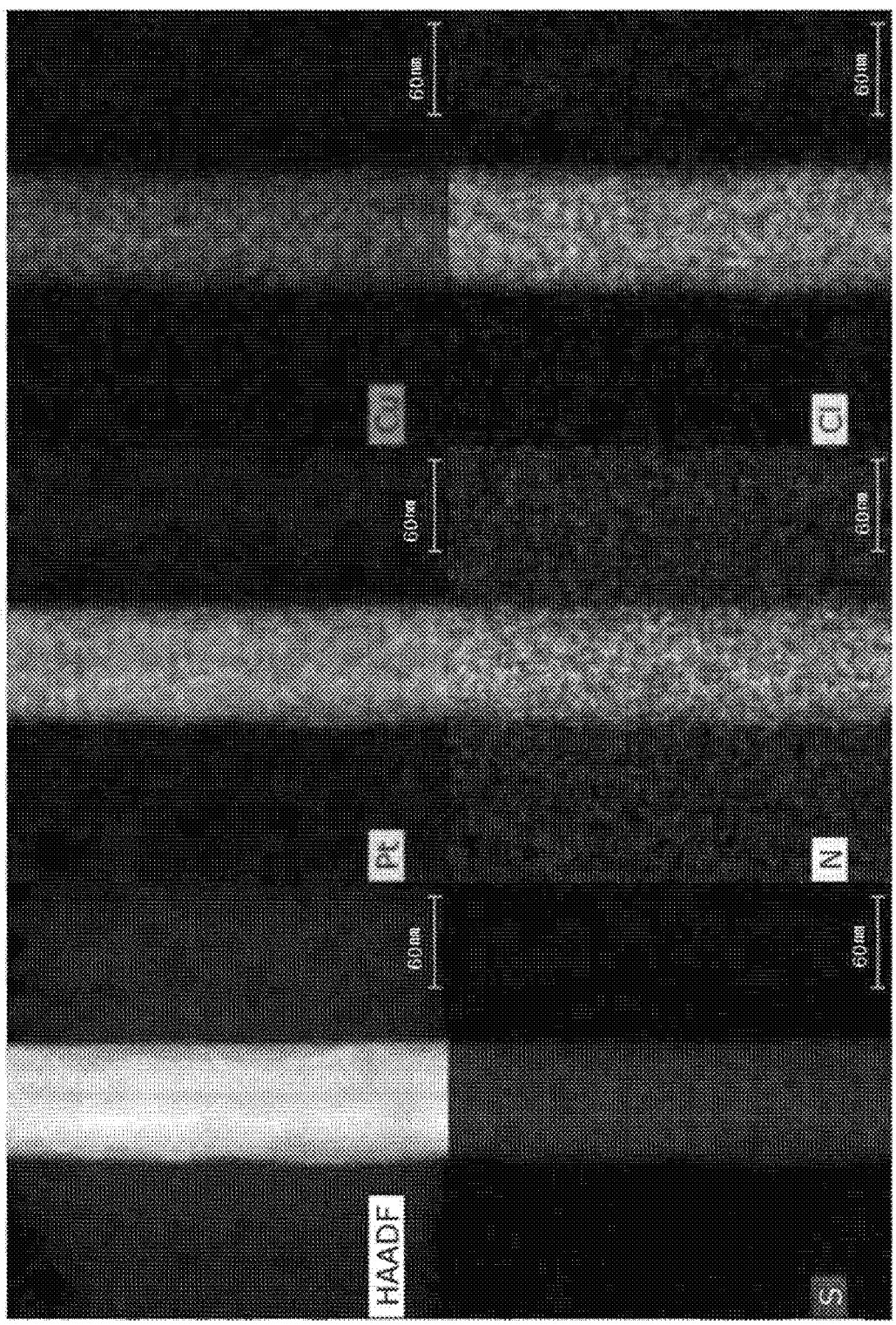

Referring to FIG. 15, an EDS mapping image adsorbed on a nanowire of preparation example 1 is disclosed in a solution in which Pt atoms are dissolved at 10 wt % in the nanowire prepared in preparation example 1. It can be seen from the EDS mapping image that Pt atoms are evenly adsorbed on the nanowire. A solution in which Pt atoms are dissolved is a solution in which $PtCl_4$ is dissolved in an aqueous solution.

Figure 16:
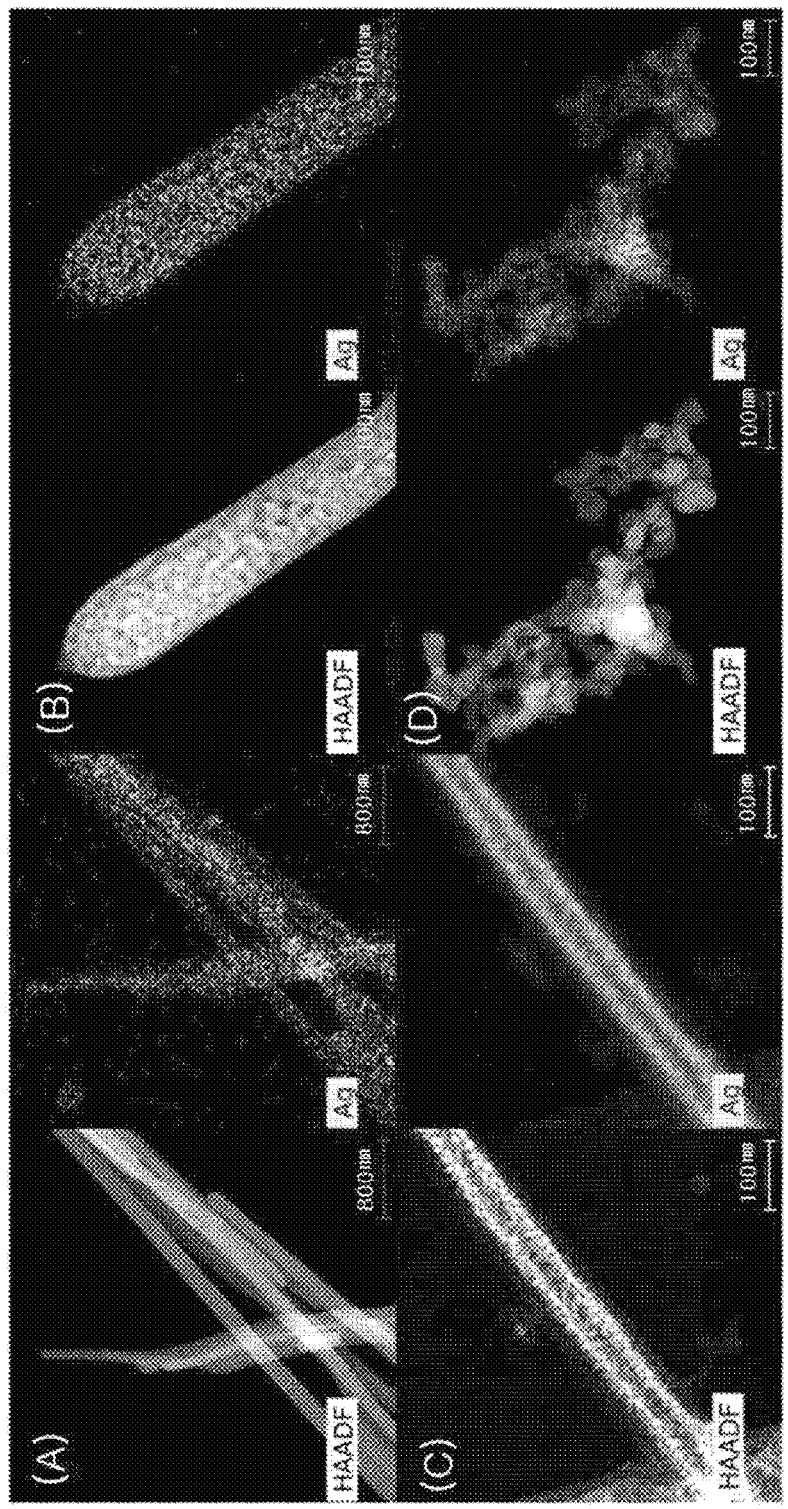

FIG. 16 is a STEM image and an EDS mapping image in which Ag elements contain 2.4 at. % (A), 16.1 at. %, 30.1 at. %, And 85.6 at. %, Respectively. When the amount of Ag precursor is 5 at. % Or less, the element is doped at the atomic level as in (A). As the amount of Ag precursor is increased, island shapes are formed in the nanowire as in (B). Increasing the amount of Ag precursor further leads to a nanowire shape including Ag particles of several tens of nanometers at the edge of the nanowire (C), and if the absorption exceeds 40 at. %, The original shape of the nanowire disappears and becomes (D)-like.

Figure 17:
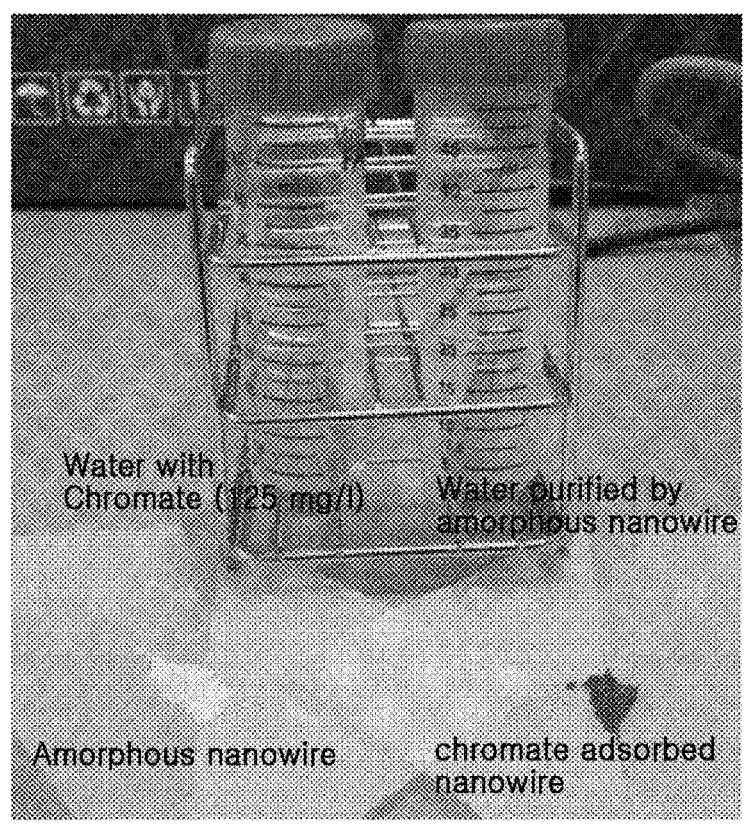

FIG. 17 is an image showing the result of mixing the amorphous nanowire of Preparation example 1 with an aqueous solution (116 mg/l) in which $K_2CrO_4$ was dissolved. In FIG. 17, it can be seen that molecular compounds such as chromates are also well adsorbed on the nanowire.

Figure 18:
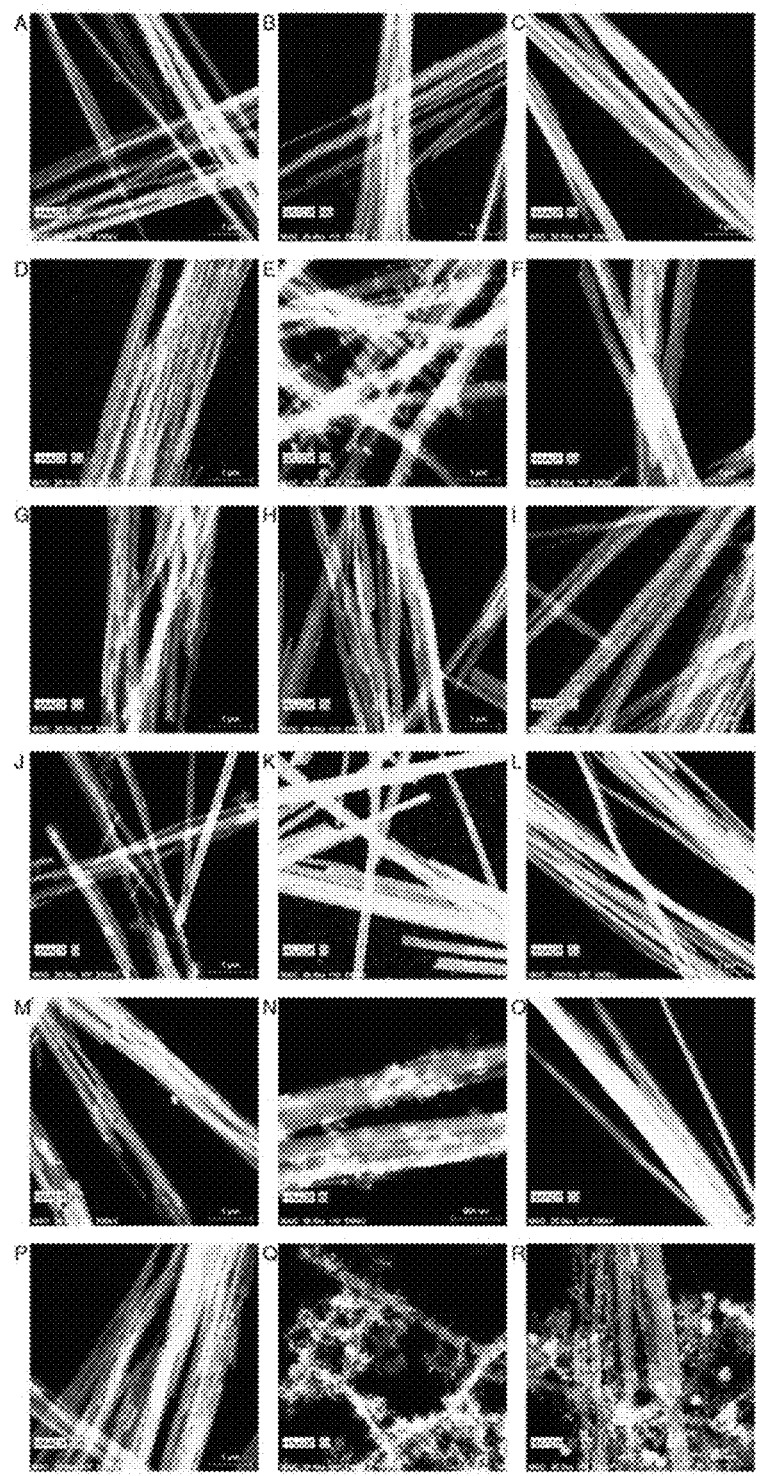
FIG. 18 is images showing the nanowire to which various metals are adsorbed according to evaluation example 1 of the present invention.

FIG. 18 is images showing the nanowire to which various metals are adsorbed according to Evaluation example 1 of the present invention.

Referring to FIG. 18, the nanowire used are the amorphous nanowire according to preparation example 1. In addition, table 2 below discloses the materials used and the adsorbent metals and solvents contained in the materials used.

TABLE 2

| Adsorbed Metal | Substances Used | amount | Solvent Used |
|---|---|---|---|
| Ag | Silver nitrate (≥99.0%) | 4 mg | Ethanol 30 ml |
| Au | Gold(III) chloride (99%) | 8 mg | Ethanol 30 ml |
| Bi | Bismuth(III) chloride (≥98%) | 8 mg | Ethanol 30 ml |
| Cd | Cadmium nitrate tetrahydrate (98%) | 8 mg | Ethanol 30 ml |
| Ce | Cerium chloride heptahydrate (≥98%) | 9 mg | Ethanol 30 ml |
| Cs | Cesium chloride (99.9%) | 4 mg | Ethanol 30 ml |
| Fe | Iron(III) chloride (97%) | 4 mg | Ethanol 30 ml |
| Gd | Gadolinium(III) chloride (99.99%) | 7 mg | Ethanol 30 ml |
| Ir | Iridium(III) chloride hydrate (99.9%) | 9 mg | Ethanol 25 ml + Water 5 ml |
| Mg | Magnesium acetate tetrahydrate (≥98%) | 5 mg | Ethanol 30 ml |
| Na | Sodium nitrate (≥99%) | 2 mg | Ethanol 25 ml + Water 5 ml |
| Pb | Lead(II) nitrate (≥99%) | 8 mg | Ethanol 25 ml + Water 5 ml |
| Pd | Palladium(II) chloride (99%) | 4 mg | Ethanol 25 ml + Water 5 ml |
| Pt | Chloroplatinic acid solution (8 wt. % in H2O) | 0.12 ml | Ethanol 30 ml |
| Ru | Ruthenium chloride hydrate (99.98%) | 7 mg | Ethanol 30 ml |
| Te | Telluric acid (98%) | 6 mg | Ethanol 25 ml + Water 5 ml |

Referring to FIG. 18 and table 2, it can be seen that 16 metal elements are evenly adsorbed to the amorphous nanowire at the atomic level. Through this, it can be seen that the amorphous nanowire can easily adsorb metals or metal ions in atomic units, and also have adsorption capacity for the form of metal salts.

Evaluation Example 2: UV-Vis Absorbance Analysis of the Synthesized Nanowire

In this evaluation example, absorbance analysis is performed on the amorphous nanowire according to preparation example 1.

Figure 19:
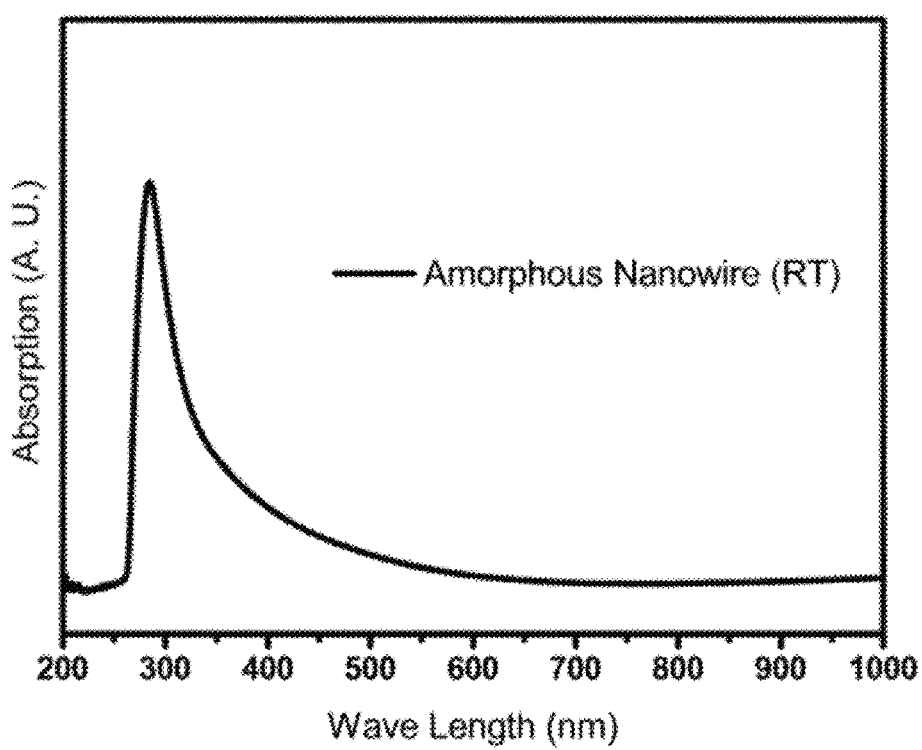
FIG. 19 is a graph showing the result of UV-Vis absorbance analysis of the amorphous nanowire according to evaluation example 2 of the present invention.

FIG. 19 is a graph showing the results of UV-Vis absorbance analysis of the amorphous nanowire according to evaluation example 2 of the present invention.

Referring to FIG. 19, an amorphous nanowire uses the nanowire according to preparation example 1. The absorbance is evaluated while changing the wavelength of incident light. At 250 nm to 400 nm of incident light, the nanowire strongly absorbs the incident light. Through this, it can be seen that the amorphous nanowire of the present invention can be used as an optical filter that absorbs or blocks light of a specific band.

In the present invention described above, it is possible to form an amorphous nanowire or spherical nanoparticles through a simple manufacturing method. A nanostructure is formed through the inorganic polymers formed, and inorganic polymers have a bonding structure of a transition metal and a halogen element in the main chain, and hydrogen elements attached to an element having a higher electronegativity than hydrogen having hydrogen bonding ability in the side chain. Moreover, it has group 15 and 16 elements used for hydrogen bonding. Hydrogen contained in the side chain forms hydrogen bonding with an element capable of hydrogen bonding or a halogen element, through which inorganic polymers are bonded to each other to form the amorphous nanowire. In addition, depending on the polarity of the polar solvent introduced in the formation process, the inorganic polymer may be formed into the spherical nanoparticle. When formed from spherical nanoparticle, halogen elements are excluded, and the functional group for bonding and transition metal having hydrogen elements and element for hydrogen bondings are bonded to each other.

The formed amorphous nanowire exhibits excellent adsorption capacity for metal ions and crystallize into other phases upon application of energy. In addition, the amorphous nanowire has a function of absorbing light in a specific wavelength band such as an ultraviolet region. Through this, it can be utilized as various functional materials.

The invention claimed is:

1. An amorphous nanostructure comprising an inorganic polymer of formula 1

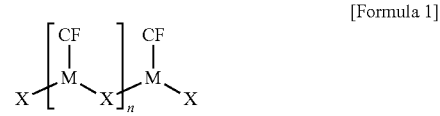

[Formula 1]

In formula 1, M represents Cu,
X represents a halogen element,
CF represent thiourea, selenourea, or tellurourea, and
n has a value of 10 to 500,000 in repetition frequency.

2. The amorphous nanostructure of claim 1, wherein the halogen element is fluorine (F), chlorine (Cl), bromine (Br), iodine (I), or a combination thereof.

3. The amorphous nanostructure of claim 1, wherein CF represents thiourea.

4. The amorphous nanostructure of claim 1, wherein a hydrogen of the thiourea, selenourea, and tellurourea forms a hydrogen bond with a halogen element of an adjacent inorganic polymer.

5. The amorphous nanostructure of claim 1, wherein the Cu has an oxidation number of +1.

6. The amorphous nanostructure of claim 1, further comprising crystallized regions formed by irradiation with an electron beam.

* * * * *